United States Patent
Kole, Jr. et al.

[11] Patent Number: 6,155,902
[45] Date of Patent: Dec. 5, 2000

[54] PUSH TOY SCOOTER WAGON

[76] Inventors: James S. Kole, Jr., 2901 Elmside, No. 105, Houston, Tex. 77042; Christene Denise Garner, 14509 S. 50th East Ave., Bixby, Okla. 74008

[21] Appl. No.: 09/427,282

[22] Filed: Oct. 26, 1999

[51] Int. Cl.[7] .................................................. A63H 27/00
[52] U.S. Cl. ................... 446/230; 280/87.01; 280/87.43
[58] Field of Search ................................ 472/130; 446/7, 446/29, 230, 231; 280/1.23, 1.5, 8, 14.3, 163, 87.01, 87.021, 87.043, 1.21, 1.22, 282, 263, 267

[56] References Cited

U.S. PATENT DOCUMENTS

| | | | |
|---|---|---|---|
| D. 163,401 | 5/1951 | McGuire | 280/87.043 |
| 1,444,295 | 2/1923 | Wynne | 280/87.01 |
| 2,913,250 | 11/1959 | La Fever | 280/87.01 |
| 3,143,359 | 8/1964 | Dupuis | 280/87.03 |
| 3,507,511 | 4/1970 | Seidel | 280/47.11 |
| 4,222,582 | 9/1980 | Tonelli et al. | 280/87.02 |
| 4,346,908 | 8/1982 | Kassai | 280/87.021 |
| 4,366,645 | 1/1983 | Crain et al. . | |
| 4,468,884 | 9/1984 | Goldfarb et al. | 446/462 |
| 4,556,397 | 12/1985 | Arad et al. | 446/436 |
| 4,699,392 | 10/1987 | Ku | 280/89.02 |
| 4,744,575 | 5/1988 | Tonelli | 280/87.01 |
| 4,991,861 | 2/1991 | Carn et al. | 280/87.042 |
| 5,092,016 | 3/1992 | McKinney | 280/87.023 |
| 5,240,451 | 8/1993 | Clark, Jr. | 446/465 |
| 5,360,222 | 11/1994 | Bro et al. | 280/87.021 |
| 5,584,743 | 12/1996 | Beaulieu | 446/427 |
| 6,000,988 | 12/1999 | Tsai | 446/231 |

*Primary Examiner*—Sam Rimell
*Attorney, Agent, or Firm*—Geoffrey A. Mantooth

[57] ABSTRACT

A wagon has a body with front and rear ends. Front wheels are rotatably coupled to the front end of the body and rear wheels are rotatably coupled to the rear end of the body. Each of the front wheels is pivotally coupled to the body. The wagon has front and rear steering members coupled to the respective front and rear ends of the body. The front and rear steering members are coupled to the front wheels so as to control the pivoting of the front wheels and thus the steering of the wagon. The rear end of the wagon has foot cavities therein which face rearward and have a bottom wall. Thus, a child pushing the wagon from the rear end can coast with the wagon by having the child's feet or foot inside the cavities. The wagon also has center wheels located between the front and rear wheels. The center wheels are raised above the front and rear wheels to provide a smoother ride over bumpy terrain.

16 Claims, 8 Drawing Sheets

PUSH TOY SCOOTER WAGON

FIELD OF THE INVENTION

The present invention relates to toy wagons that are used by children for play.

BACKGROUND OF THE INVENTION

Toy wagons have existed for years. Children take great delight in playing with wagons. Many adults have fond memories of pulling their wagon (usually red) around or riding in it having someone else do the pulling.

A traditional wagon has four wheels and a pulling handle in front. The wagon is steered by moving the tongue handle from side to side; this turns the front wheels. Many children would like to push their wagon from behind. However, traditional wagons are difficult to push from behind because the steering tongue handle does not reach back to the rear. In addition, some children would like to use their wagon much like a scooter, where the wagon is pushed from behind to gain momentum and the pusher then jumps on board to ride. The rear wall of a traditional wagon impedes the pushing child from stepping on board to ride the wagon like a scooter.

Furthermore, a more traditional wagon can be very bumpy to ride. Many neighborhoods suffer from sidewalks and streets with cracks and holes. When a wagon wheel hits a crack or hole, the whole wagon is jarred.

SUMMARY OF THE INVENTION

It is an object of the present invention to provide a wagon that can be steered from the rear end.

It is another object of the present invention to provide a wagon that can be easily ridden from behind.

It is another object of the present invention to provide a wagon that can ride over cracks and holes in a sidewalk or street with less jarring and with less tendency for tipping over.

The present invention provides a push toy scooter wagon that comprises a body having a front end portion and a rear end portion. The body has a bed therein. The wagon has front wheels rotatably coupled to the body and rear wheels rotatably coupled to the body. The front wheels are pivotally coupled to the body so as to steer the wagon. The wagon has a foot cavity located in the rear end portion of the body. The foot cavity faces rearwardly and has a bottom wall therein. A steering member is located at the rear end portion of the body. The steering member is coupled to the front wheel so as to control the pivoting of the front wheels. The steering member has a portion that extends above the foot cavity. The steering member is movable so as to pivot the front wheels and steer the wagon. The steering member is movable without obstructing the foot cavity.

In accordance with one aspect of the invention, the wagon further comprises center wheels located between the front and rear wheels. The center wheels are raised relative to the front and rear wheels.

In accordance with another aspect of the present invention, the center wheels are raised relative to the front and rear wheels due to the center wheel axle being raised relative to the axles of the front and rear wheels. Alternatively, the center wheels are raised relative to the front and rear wheels due to the center wheels having an outside diameter that is smaller than the outside diameters of the front and rear wheels.

In accordance with another aspect of the present invention, the wagon further comprises a pull handle that is coupled to the front end of the body. The handle is independent of the steering member.

In accordance with another aspect of the present invention, the steering member is a first steering member. The wagon further comprises a second steering member located at the front end portion of the body. The second steering member is coupled to the front wheel so as to control the pivoting of the front wheels.

In accordance with another aspect of the present invention, the second steering member comprises a handle portion that is removable from the body.

In accordance with still another aspect of the present invention, the first steering member comprises a handle portion that is removable from the body.

In accordance with another aspect of the present invention, the first and second steering members are coupled together as well as to the front wheels.

In accordance with another aspect of the present invention, the second steering member comprises a handle portion that is located in the bed.

The present invention also provides a push toy wagon that comprises a body having a front end portion and a rear end portion. The body has a bed therein. Front wheels are rotatably coupled to the body and rear wheels are rotatably coupled to the body. The front wheels are pivotally coupled to the body so as to steer the wagon. A first steering member is located at the rear end portion of the body. The first steering member has a first handle portion that is accessible from the rear end of the body. A second steering member is located at the front end portion of the body. The second steering member has a second handle portion that is accessible from the bed of the body. The first and second steering members are coupled to the front wheels so as to control the pivoting of the front wheels.

The present invention also provides a push toy wagon that comprises a body having a front end portion and a rear end portion. The body has a bed therein. Front wheels are rotatably coupled to the body and rear wheels are rotatably coupled to the body. The front wheels are pivotally coupled to the body so as to steer the wagon. A steering member is coupled to the front wheels so as to control the pivoting of the front wheels. Center wheels are located between the front and rear wheels. The center wheels are raised relative to the front and rear wheels.

In accordance with one aspect of the present invention, the center wheels are raised relative to the front and rear wheels due to the axle of the center wheels being raised relative to the axles of the front and rear wheels. Alternatively, the center wheels are raised relative to the front and rear wheels due to the center wheels having an outside diameter that is smaller than the outside diameters of the front and rear wheels.

In accordance with still another aspect of the present invention, the wagon has a foot cavity located in the rear end portion of the body. The foot cavity faces rearwardly and has a bottom wall therein.

DESCRIPTION OF THE PREFERRED EMBODIMENT

Figure 1:
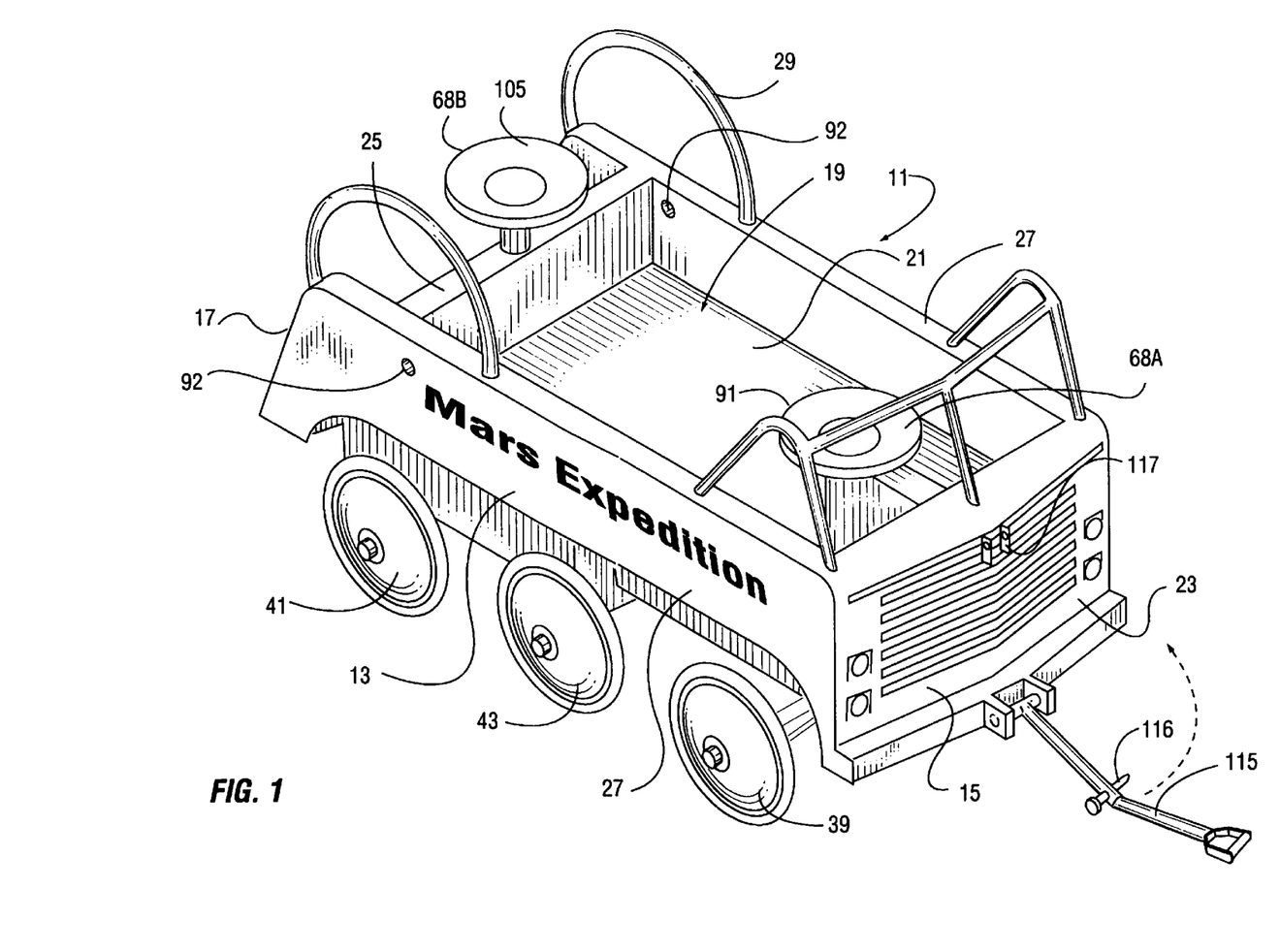
FIG. 1 is an isometric front view of the wagon of the present invention, in accordance with a preferred embodiment.
Figure 2:
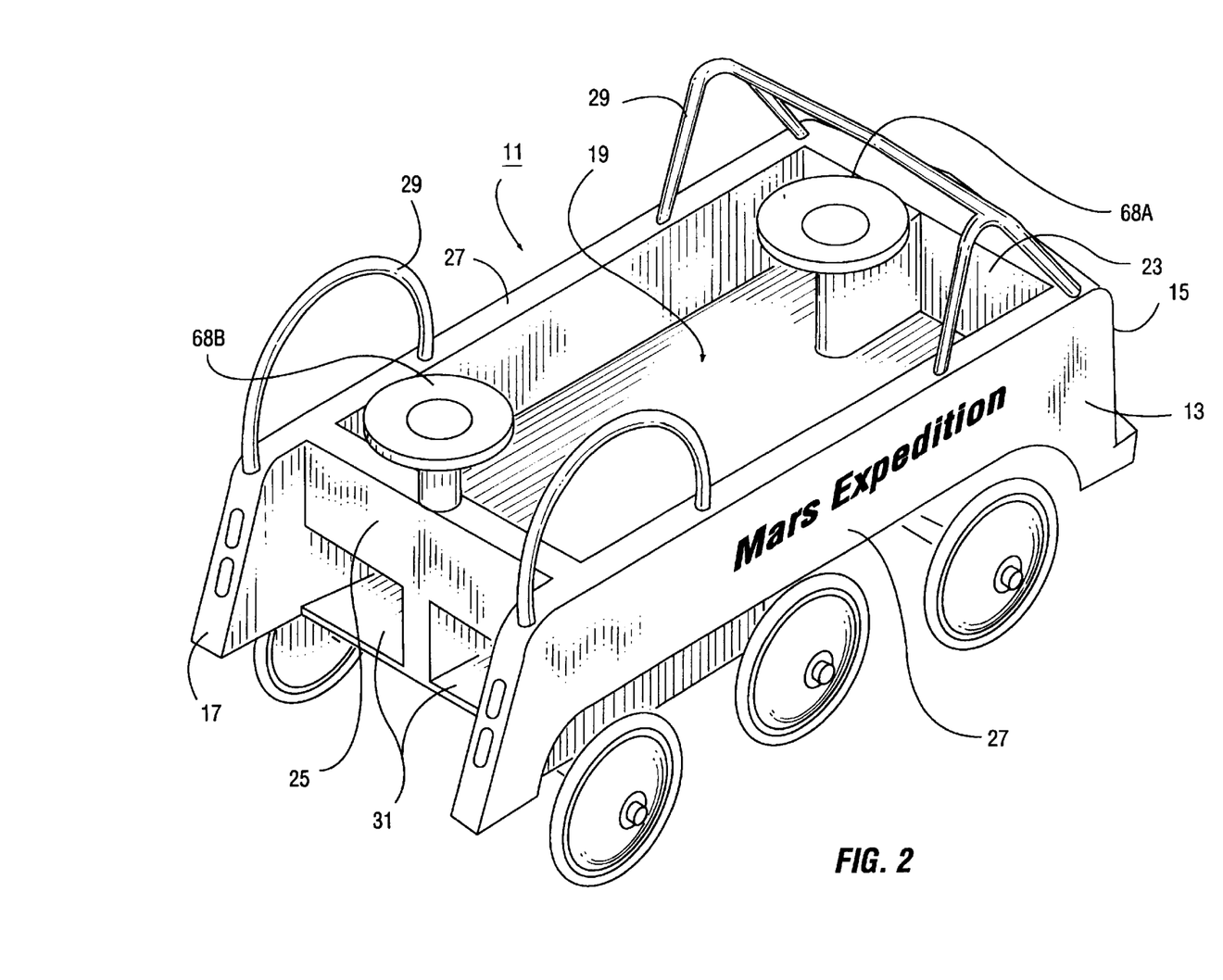
FIG. 2 is an isometric rear view of the wagon of FIG. 1.

In FIGS. 1 and 2, there are shown views of the push wagon 11 of the present invention, in accordance with a preferred embodiment. The push wagon 11 can be used by one or more children or by a child and an adult.

The wagon 11 can be pushed from the rear by a child and ridden like a scooter.

The push wagon 11 has a body 13 that is rigid and forms a frame. The body 13 has front and rear ends 15, 17.

The body 13 also has a bed 19 therein for holding a child and/or cargo. The bed has a bottom wall 21 and side walls that extend up from the bottom wall. Specifically, there is a front wall 23, a rear wall 25 and lateral walls 27. The lateral walls 27 extend beyond the rear wall 25 somewhat. The front wall 23 depends below the bottom wall 21. There is also a railing 29 and/or handles shown extending from the front and rear portions.

Although the body 13 has been described as being boxish and rectangular, it can be styled in a variety of ways. For example, the body can be styled as a fire truck, racer, go kart, etc.

Figure 3:
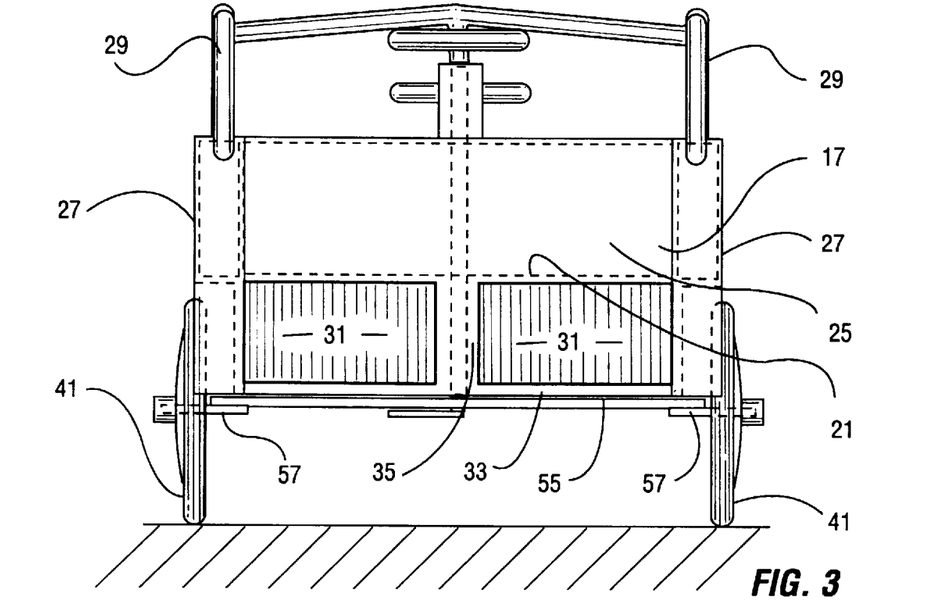
FIG. 3 is a rear elevational view of the wagon.
Figure 4:
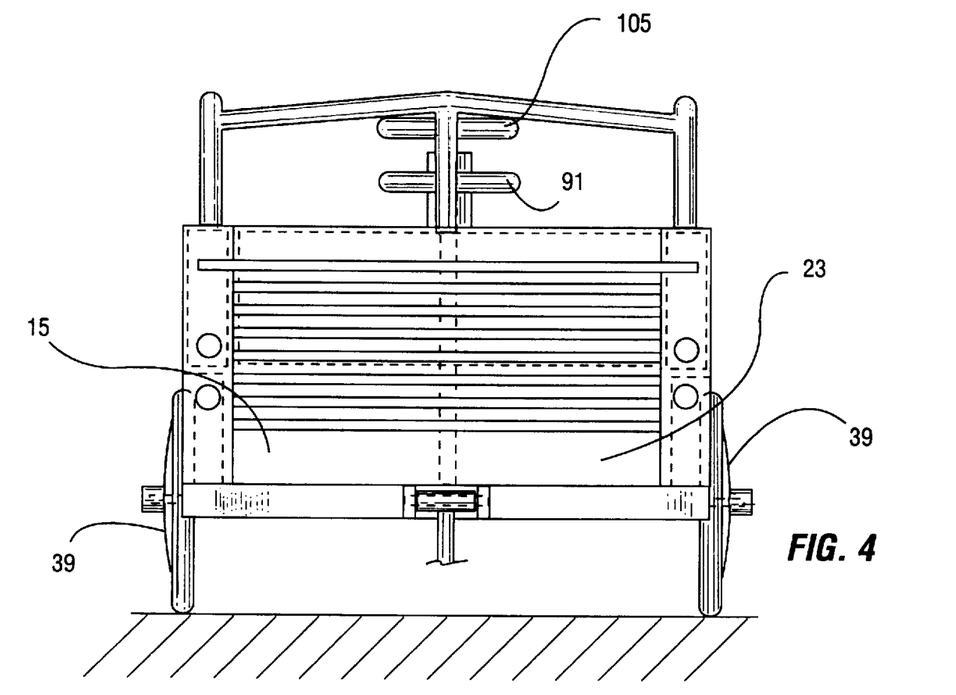
FIG. 4 is a front elevational view of the wagon.

As shown in FIGS. 2 and 3, the rear end 17 of the wagon has two side by side foot placement cavities 31. In the preferred embodiment, the cavities 31 are located under the bottom wall 21. The cavities 31 are formed by a lower wall 33, a center wall 35 and the lateral walls 27. The cavities 31 are rearwardly facing and are designed to receive the feet of a child. The fronts of the cavities are closed by an intermediate wall 37 (see FIG. 5). The cavities 31 could be constructed as a single cavity that is large enough to accommodate two feet.

Figure 5:
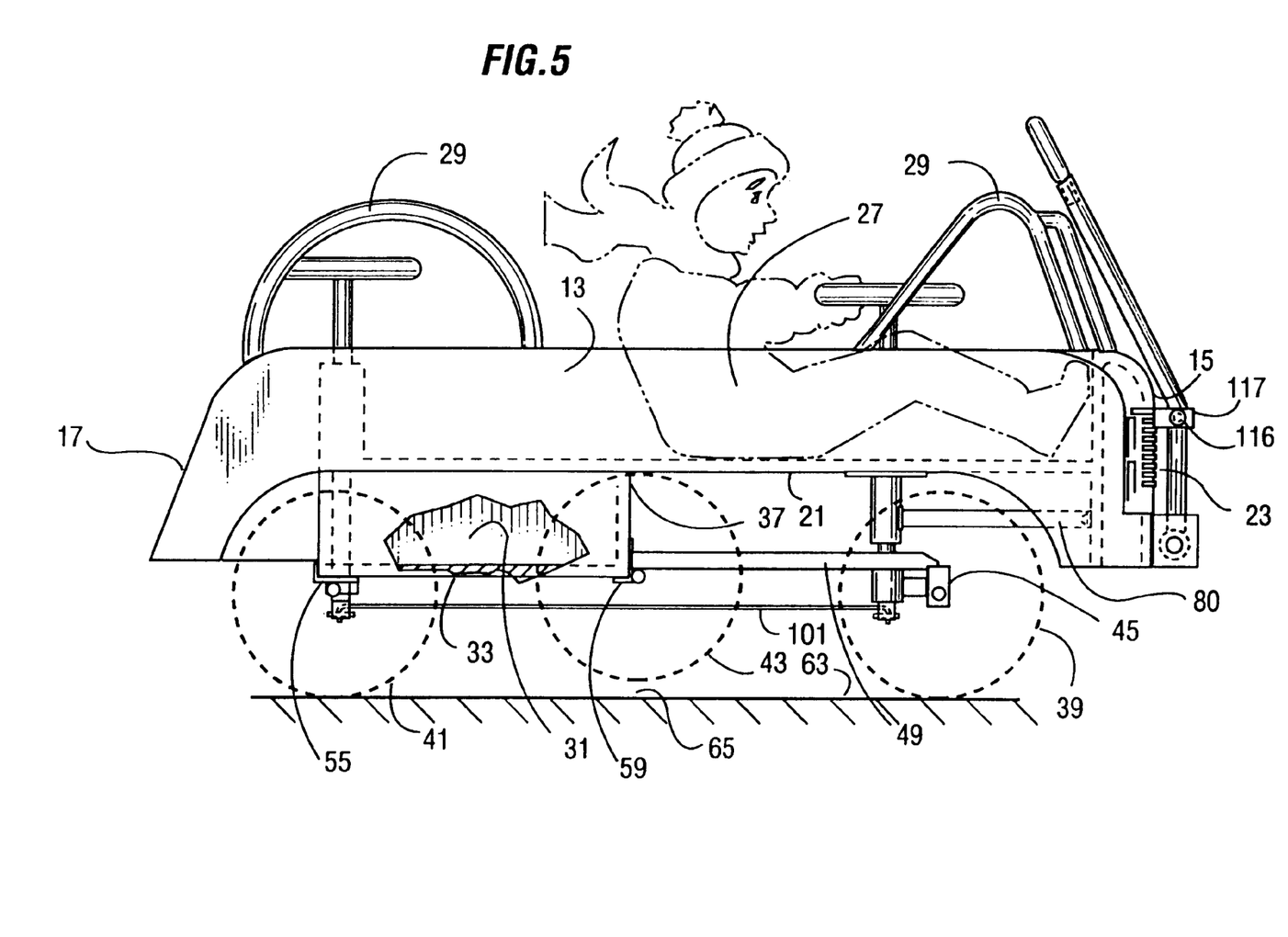
FIG. 5 is a side elevational view of the wagon.

As shown in FIGS. 1, 2 and 5, in the preferred embodiment, the wagon has six wheels, three on each side. There is a front pair of wheels 39 at the front end 15, a rear pair of wheels 41 at the rear end 17 and a center pair of wheels 43 between the front and rear wheels. All of the wheels are mounted on axles.

Figure 6:
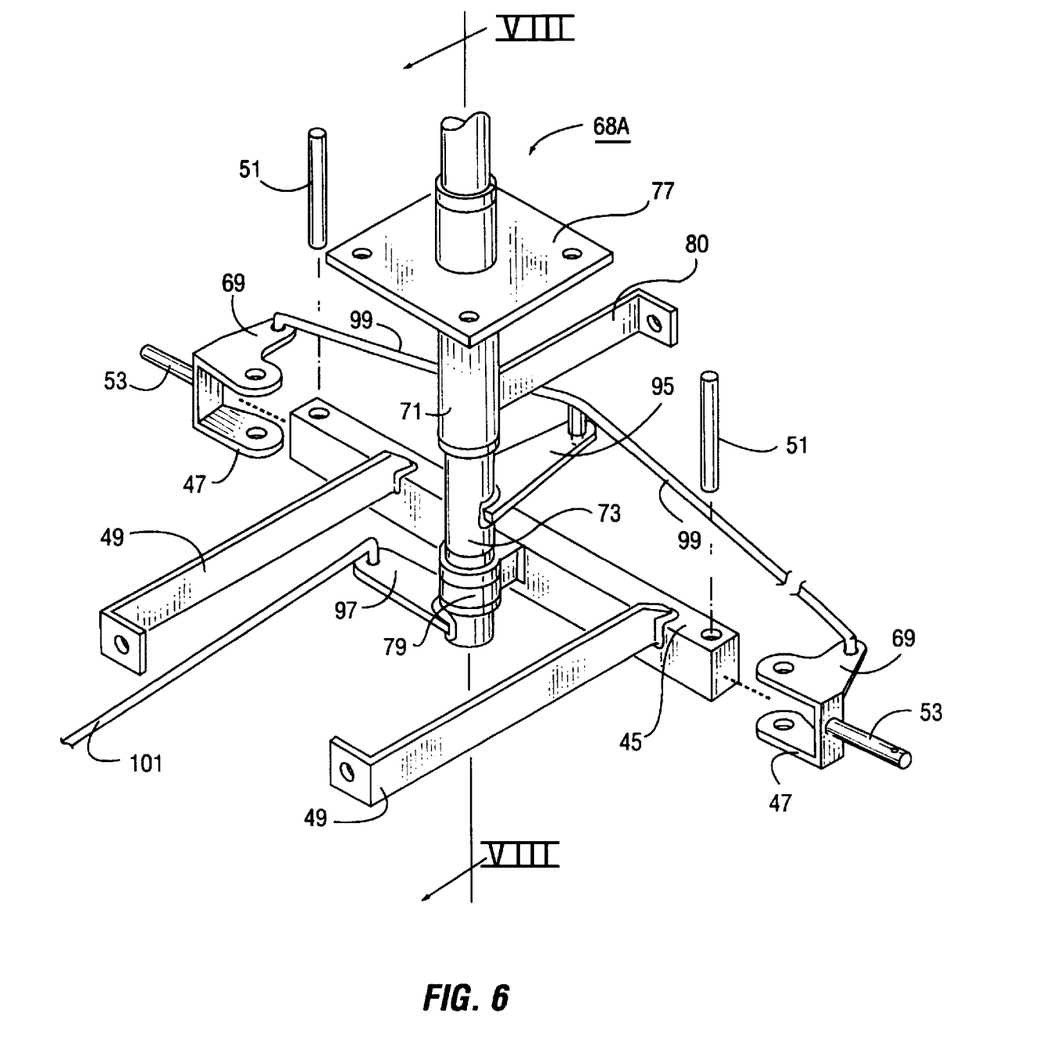
FIG. 6 is an isometric view of the front steering arrangement.

The front wheels 39 can pivot from side to side to steer the wagon. Referring to FIG. 6, the front wheels are mounted to the body by way of a front bar 45 and yokes 47. The bar 45 is located underneath and behind the front end 15 of the body (see FIG. 5). The front bar 45 has supports 49 that extend rearwardly to the intermediate wall 37. The front bar extends from side to side of the wagon. At each end of the front bar 45, there is a yoke 47 coupled thereto by a vertical pin 51. Each yoke 47 has a horizontal axle 53 extending out therefrom. The front wheels 39 are mounted onto the axles 53. The wheels 39 and the yokes 47 can pivot about the pins 51 to steer the wagon. The steering arrangement will be discussed hereinafter.

Figure 7:
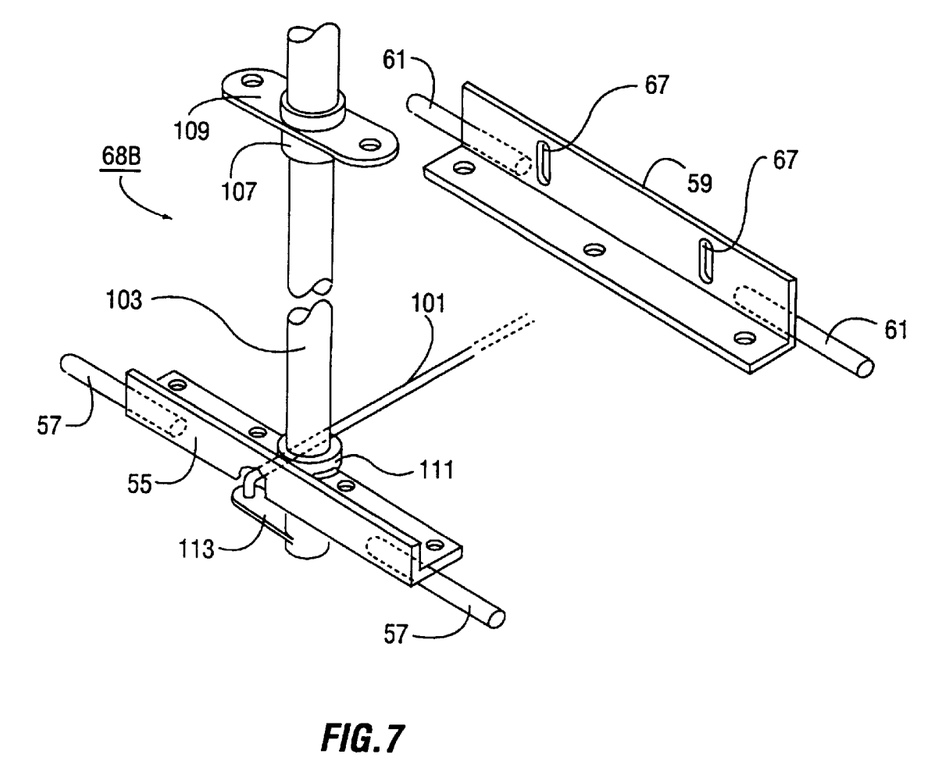
FIG. 7 is an isometric view of the rear steering arrangement and the center wheel axle arrangement.

Referring to FIGS. 3 and 7, the rear wheels 41 are coupled to the body 13 by way of an angle bracket 55. The angle bracket 55 is secured to the rear and bottom of the lower wall 33. Axles 57 extend laterally out from the bracket. The rear wheels 41 are mounted on the axles 57.

The center wheels 43 are coupled to the body 13 by a similar angle bracket 59, with axles 61 extending laterally out. The angle bracket 59 is coupled to the intermediate wall 37 and the lower wall 33 (see FIG. 5).

To enable steering of the wagon, the center wheels 43 are slightly elevated relative to the front and rear wheels 39, 41 (see FIG. 5). Thus, on a smooth, flat riding surface 63, the front and rear wheels 39, 41 will contact the surface, but the center wheels 43 will not. Instead, there is a small gap 65 between the center wheel 43 and the surface 63.

The height of the center wheels 43 above the surface 63 can be adjusted. The angle bracket 59 (see FIG. 7) has slots 67 that receive screws into the intermediate wall 37. By loosening the screws, the angle bracket can be adjusted to vary the height of the center wheels. Shims (not shown) can be placed between the angle bracket and the lower wall 33. Once the height is set, the screws are tightened to maintain the height.

By elevating the center wheels 43 above a smooth flat it surface, the wagon 11 can be turned more easily. The center wheels are not dragged laterally. If the wagon encounters rough terrain, then the center wheels help in traversing the terrain. The center wheels are particularly useful for creating a bridging effect over holes and cracks. For example, if the front wheels 39 encounter a crack in a sidewalk, the rear and center wheels 41, 43 will maintain the wagon level and prevent the front wheels from entering the crack. The front wheels thus cross or bridge over the crack with minimal vibration and jarring of the wagon. When the center wheels encounter the crack, the front and rear wheels support the wagon and prevent the center wheels from entering the crack. Likewise, when the rear wheels encounter the crack, the wagon is supported by the front and center wheels.

Thus, the provision of the center wheels 43 adds to the stability and safety of the wagon. If one wheel of the wagon encounters a hole in the riding surface, instead of one corner of the wagon dipping down and possibly throwing out its occupant, the wagon remains generally horizontal.

The same bridging effect can be accomplished by using center wheels of slightly smaller diameter than the front and rear wheels. The axles of all of the wheels would all be level with each other. For example, in the embodiment shown in FIG. 2, the center wheels 43A are of a slightly smaller diameter than the front and rear wheels 39, 41.

The embodiment shown in the Figs. has six wheels. Thus, there is a center wheel on each side. The wagon of the present invention could have more center wheels, such as two or three center wheels per side. In order to make the wagon easier to steer, all of the center wheels would be raised slightly off of the riding surface or ground.

If steering is not of a concern, such as where the wagon is designed to run in a straight line, then the center wheels can be at the same elevation as the front and rear wheels so that all of the wheels contact a smooth, flat riding surface.

The wagon has front and rear steering arrangements 68A, 68B. The wagon can be steered using either steering arrangement.

The front steering arrangement will now be discussed with reference to FIG. 6. As previously discussed, the wagon is steered by the front wheels 39. Each front wheel yoke 47 has a tab 69 thereon. The yoke tabs 69 are coupled to the front steering member by tie rods. The tabs 69 provide a pivot point that is either fore or aft of the pivot pins 51. This allows both yokes to be pivoted with a more simplistic arrangement.

Figure 8:
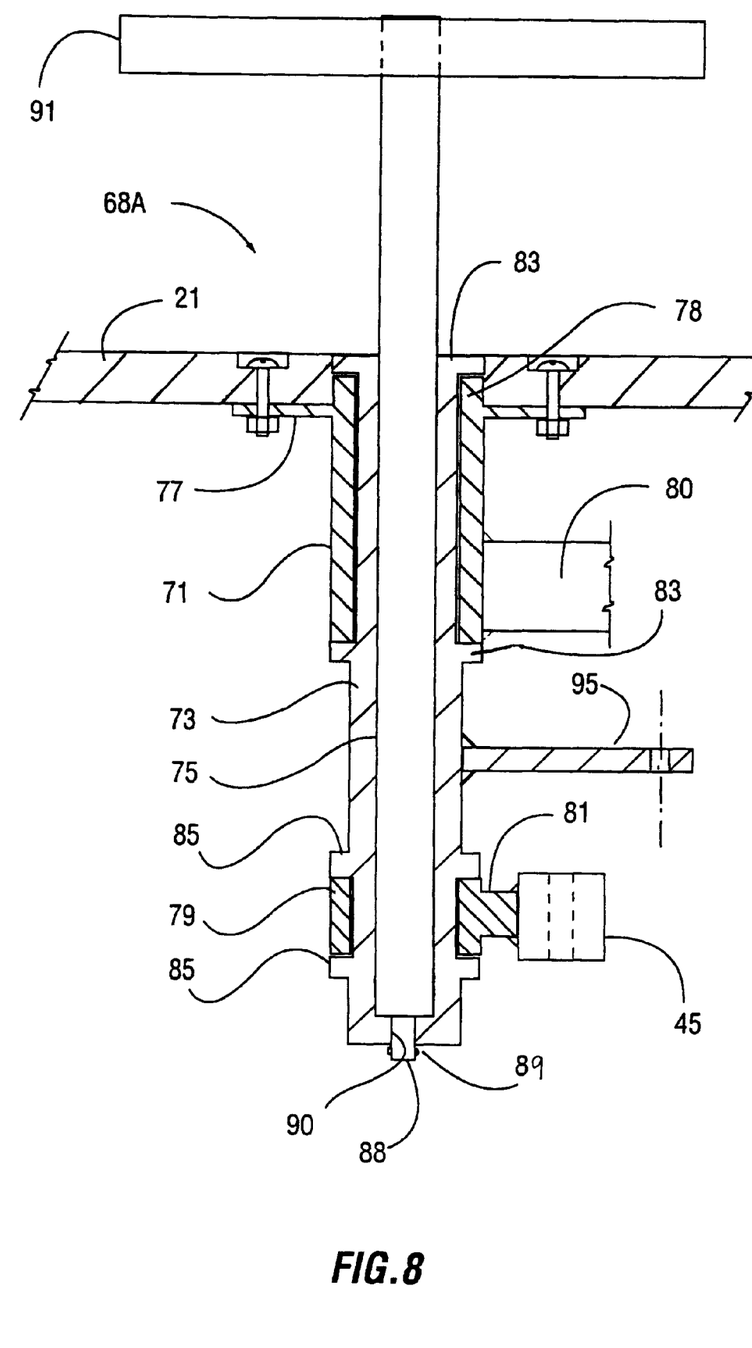
FIG. 8 is a cross-sectional view, taken along lines VIII—VIII of FIG. 6.

The front steering arrangement 68A, which is shown in FIG. 8, has a stationary sleeve 71, a rotating sleeve 73 and a steering shaft 75.

The stationary sleeve 71 is generally cylindrical and has a flange 77 extending out therefrom. The flange 77 is coupled to the bottom wall 21 of the wagon, near the front bar 45. The majority of the stationary sleeve 71 depends from the bottom wall. The stationary sleeve forms a lip 78 that protrudes above the flange 77.

The rotating sleeve 73 is located inside of the stationary sleeve 71. The rotating sleeve 73 extends through the stationary sleeve to an elevation that is below the front bar 45. The rotating sleeve 73 is received by a lower sleeve 79, which lower sleeve is coupled to the front bar 45 by a flange 81. The rotating sleeve 73 can rotate within the stationary sleeve 71 and the lower sleeve 79. The stationary and lower sleeves 71, 79 serve as bushings. The rotating sleeve 73 is otherwise constrained from moving by the stationary and lower sleeves 71, 79.

The steering member-front bar arrangement is braced by a support 80 that extends from the stationary sleeve 71 to the front wall 23 of the body and also by supports 49 that extend from the front bar to the lower front wall.

The rotating sleeve 73 has flanges 83, 85 thereon to prevent axial movement of the rotating sleeve. Thus, there is a first set 83 of lower flanges that bear on the respective upper and lower ends of the stationary sleeve 71. In addition, the rotating sleeve 73 has a second set 85 of upper and lower flanges that bear on the respective upper and lower ends of the lower sleeve 79. The sets 83, 85 of flanges are shown as being welded to the rotating sleeve. Alternatively, the flanges can be attached by some other mechanism, such as by threads.

The steering shaft 75 is received by the rotating sleeve 73. At the bottom end of the steering shaft 75 there is an axially extending pin 88. The pin 88 extends through an opening 90 in the bottom of the rotating sleeve. Spring loaded detent balls 89 in the pin 88 assist in securing the steering shaft 75 inside of the rotating sleeve 73. The steering shaft 75 extends upward from the bottom wall 21. A steering wheel 91 is coupled to the upper end of the steering shaft 75. Alternatively, a tiller or other device can be coupled to the top end of the steering shaft 75. The steering shaft 75 and the wheel 91 make up a removable handle portion.

To remove the steering shaft 75 from the rotating sleeve 73, the shaft 75 is pulled up with sufficient force so as to allow the detent balls 89 to depress in and clear the opening 90. Once removed, the steering shaft 75 and steering wheel 91 can be stowed on the wagon. Each lateral wall 27 has an opening 92 therethrough (see FIG. 1). The steering shaft 75 is located on the outside of a lateral wall 27 and inserted through the respective opening 92, across the bed 19 adjacent to the rear wall 25 and through the opening 92 in the other lateral wall. Thus, the stowed shaft 75 lays horizontal, with the steering wheel 91 adjacent to the outside of the one of the lateral walls. The pin 88 and detent balls 89 snap fit into the respective lateral wall opening, which is appropriately sized.

The steering shaft 75 is generally cylindrical. In order to have the steering shaft 75 rotate the rotating sleeve 73, the pin 88 is square in transverse cross-section. The opening 90 is likewise square.

The rotating sleeve 73 has arms 95, 97 coupled thereto and that extend out horizontally. A first arm 95 extends either forward (shown in FIG. 6) or rearwardly. The first arm 95 is coupled to each of the yokes 47 by respective tie rods 99. The second arm 97 extends laterally of the rotating sleeve. It is coupled by a tie rod 101 to the rear steering arrangement 68B, which will be described below.

In operation, the child or operator turns the steering wheel 91. This causes the steering shaft 75 and the rotating sleeve 73 to rotate. The first arm 95 rotates, activating the tie rods 99, which in turn causes the yokes 47 to pivot. The axles 53 and front wheels 39 correspondingly pivot. For example, if the steering wheel 91 is turned to the right, the rightmost tie rod pushes the right yoke and the leftmost tie rod pulls the left yoke. The front wheels thus turn to the right. Subsequently, turning the steering wheel to the left will move the front wheels to the left to either straighten the path of the wagon or to turn left.

The rear steering member 68B is shown in FIG. 7. The rear steering member has a steering shaft 103 and a steering wheel 105 coupled to the upper end thereof. The rear steering shaft 103 extends through a borehole 25 in the rear wall 25 and is received by an upper sleeve 107 or bushing that is coupled to the top of the rear wall by a flange 109. The rear steering shaft 103 is also received by a lower sleeve 111 or bushing that is part of the rear bracket 55. In the embodiment shown in FIG. 7, the lower end of the steering shaft 103 depends from the bracket 55 and has an arm 113 coupled thereto. The arm extends laterally in the same direction as the second arm 97 (FIG. 6). The two arms are coupled together with the tie rod 101.

The movement of the front steering arrangement 68A is in unison with the movement of the rear steering arrangement 68B. As the rear steering arrangement rotates, the front steering arrangement likewise rotates. For example, rotating the rear steering wheel 105 to the left causes the arm 113 (FIG. 7) to move rearwardly. This in turn pulls the second arm 97 (FIG. 6) on the front steering member rearwardly, wherein the first arm 95 is moved left. The front wheels likewise move left.

The rear steering shaft 103, and its steering wheel 105, can be detachable, in a manner similar to the front steering shaft 75. If this detachable feature is desired, then the rear bracket 55 has a rotating sleeve depending therefrom. The bottom end of the rotating sleeve is closed. The arm is coupled to the rotating sleeve. The lower end steering shaft is received in the rotating sleeve. The steering shaft has ball detents that are received by a quick connect interlocking cavity located at the end of the rotating sleeve. The square flat surfaces on the pin 88 serve as a drive mechanism so that the steering shaft can rotate the rotating sleeve. In addition, the rear steering shaft 103 and steering wheel 105 can be stowed in the openings 92, as discussed above with respect to the front steering shaft. The rear steering arrangement 68B does not obstruct the foot cavities 31.

The removability or detachability of the steering shafts 75, 103 is optional. The steering shafts can be permanently coupled to the remainder of the steering arrangements.

At the front end of the wagon is a telescoping handle 115 (see FIG. 1). The handle 115 is optional and need not be provided. One end of the handle 115 is pivotally coupled to the body. A catch 117 at the top of the front end secures the handle in an upright position. The handle can telescope out to lengthen. The catch 117 is "U" shaped and receives a pin 116 that extends through the handle 115 to secure the handle in a vertical and upright position, as shown in FIG. 5. To release the handle, the pin 116 is removed, the handle is brought forward and telescoped out. The pin is reinserted to lock the handles in its extended form. The handle 115 is independent of the steering arrangements 68A, 68B.

A child can use the push wagon 11 either alone or with someone else. If the child is alone, the child can push the wagon from behind. To do so, the child grasps the rear end of the wagon and pushes (the child may grab the rear steering wheel and push against it). When the wagon has reached the desired velocity, the child puts his feet into the cavities 31 and rides the wagon while it coasts much like a scooter. The child can keep one foot on the wagon while pushing off with the other foot to regain momentum. Steering is accomplished by turning the rear steering wheel 105. Thus, the child can both push and steer the wagon from the rear end. The front steering wheel 91 and shaft 75 can be removed and stowed as described above.

Alternatively, the child can pull the wagon with the handle 115, if the wagon is so equipped. However, steering is controlled by one of the steering wheels.

If two children are playing together, one can sit or ride in the bed 19 of the wagon body, while the other pushes the wagon from the rear end 17. The child that is riding inside of the wagon steers using the front steering wheel 91. The rear steering wheel 105 and shaft 103 can be removed and stowed. The child who is pushing can jump up into the foot cavities 31 to enjoy the ride while the wagon coasts. Alternatively, one child can pull the other with the handle, with the steering being accomplished by the child who is being pulled.

If a child and an adult are playing, the adult can pull the wagon with the handle 115. The handle telescopes out to accommodate the larger stature of the adult. The child can either ride in the wagon bed 19 and help steer with the front steering wheel 91, or help push and steer the wagon from the rear. The child can ride the wagon, standing in the foot cavities. If a second child is also playing, one child can ride while the other child is at the rear end.

The push wagon 11 builds rapport between an adult and a child. This is because each person must make a contribution to the work of moving the wagon. The adult pulls the wagon, but is unable to steer with the handle. The adult must rely on the child to steer the wagon (using either steering wheel). The child relies on the adult to provide the power to pull the wagon.

Figure 9:
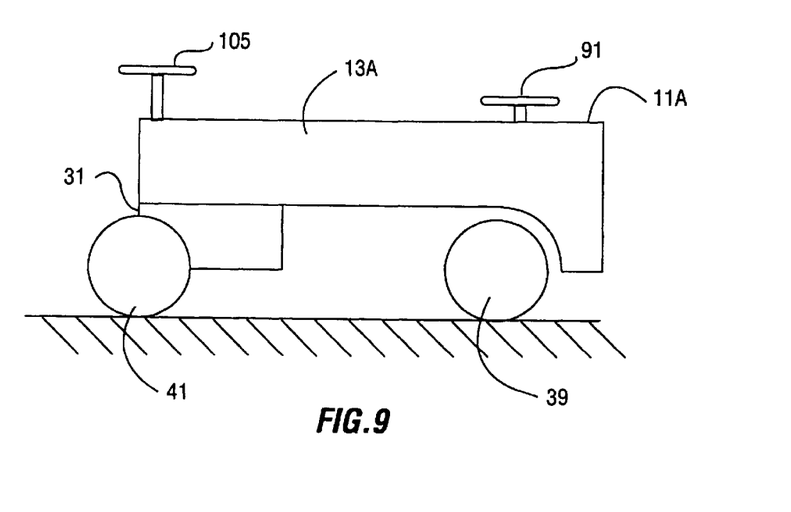
FIG. 9 is a schematic side elevational view of the wagon, in accordance with another embodiment.

FIG. 9 shows another embodiment of the wagon 11A. The wagon 11A has only four wheels, namely front and rear wheels. There are no center wheels. However, the wagon has front and rear steering wheels 91, 105 and foot cavities 31.

Figure 10:
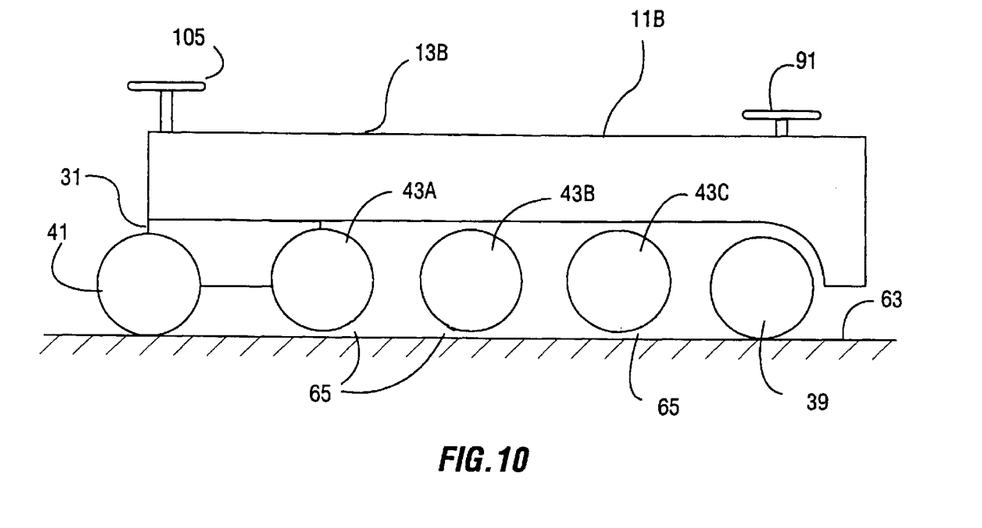
FIG. 10 is a schematic side elevational view of the wagon, in accordance with still another embodiment.

FIG. 10 shows an elongated wagon 11B, having plural sets of center wheels 43A, 43B, 43C. The center wheels are raised up off of the ground 63, or riding surface, so as to form gaps 65. The wagon 11B is very stable over uneven terrain.

Although the steering arrangements have been described as using tie rods, other devices can be used. For example, cable can be used. Because cable cannot be pushed, two cables will need to be used to control each front wheel, one to pull in one direction, the other to pull in the opposite direction.

In the embodiment described above, the body is made out of wood and the steering arrangements are made out of metal. However, other materials can be used. For example, the body 13 van be molded plastic. The stationary sleeve 71 and brackets 55, 59 would be integral with the body 13. The wheels can be traditional wagon wheels or they can be all terrain tires. The wagon can optionally be equipped with brakes for the tires or wheels. The handle 115 is optional; the wagon need not have one.

Although the steerable front wheels 39 have been described as being coupled to the body by way of pivotable yokes 47, other arrangements can be used. For example, the front wheels can be coupled to, in effect, a single axle, which axle then pivots with respect to the body to steer the wagon.

The foregoing disclosure and showings made in the drawings are merely illustrative of the principles of this invention and are not to be interpreted in a limiting sense.

What is claimed is:

1. A push toy scooter wagon, comprising:
   a) a body having a front end portion and a rear end portion, the body having a bed therein;
   b) front wheels rotatably coupled to the body and rear wheels rotatably coupled to the body, the front wheels being pivotally coupled to the body so as to steer the wagon;
   c) a foot cavity located in the rear end portion of the body, the foot cavity facing rearwardly and having a bottom wall therein;
   d) a steering member located at the rear end portion of the body, the steering member being coupled to the front wheels so as to control the pivoting of the front wheels, the steering member having a portion that extends above the foot cavity, the steering member being movable so as to pivot the front wheels and steer the wagon, the steering member being movable without obstructing the foot cavity.

2. The push toy wagon of claim 1 further comprising center wheels located between the front and rear wheels, the center wheels being raised relative to the front and rear wheels.

3. The push toy wagon of claim 2 wherein the front, center and rear wheels are mounted on respective axles, the axle of the center wheels being raised relative to the axles of the front and rear wheels.

4. The push toy wagon of claim 2 wherein the front and rear wheels each have an outside diameter, the center wheels have an outside diameter that is smaller than the outside diameters of the front and rear wheels.

5. The push toy wagon of claim 1 further comprising a pull handle coupled to the front end of the body, the handle being independent of the steering member.

6. The push toy wagon of claim 1 wherein the steering member is a first steering member, further comprising a second steering member located at the front end portion of the body, the second steering member being coupled to the front wheels so as to control the pivoting of the front wheels.

7. The push toy wagon of claim 6 wherein the second steering member comprises a handle portion that is removable from the body.

8. The push toy wagon of claim 6 wherein the first steering member comprises a handle portion that is removable from the body.

9. The push toy wagon of claim 6 wherein the first and second steering members are coupled together as well as to the front wheels.

10. The push toy wagon of claim 6 wherein the second steering member comprises a handle portion that is located in the bed.

11. The push toy wagon of claim 1, further comprising:
   a) center wheels located between the front and rear wheels, the center wheels being raised relative to the front and rear wheels;

b) the steering member is a first steering member, further comprising a second steering member located at the front end portion of the body, wherein the second steering member is coupled to the front wheel so as to control the pivoting of the front wheels;

c) one of the first or second steering members comprises a handle portion that is removable from the body;

d) the first and second steering members are coupled together as well as to the front wheels;

e) a pull handle coupled to the front end of the body, the handle being independent of the first and second steering members.

12. A push toy wagon, comprising:

a) a body having a front end portion and a rear end portion, the body having a bed therein;

b) front wheels rotatably coupled to the body and rear wheels rotatably coupled to the body, the front wheels being pivotally coupled to the body so as to steer the wagon;

c) a first steering member located at the rear end portion of the body, the first steering member having a first handle portion that is accessible from the rear end of the body;

d) a second steering member located at the front end portion of the body, the second steering member having a second handle portion that is accessible from the bed of the body;

e) the first and second steering members being coupled to the front wheels so as to control the pivoting of the front wheels.

13. A push toy wagon, comprising:

a) a body having a front end portion and a rear end portion, the body having a bed therein;

b) front wheels rotatably coupled to the body and rear wheels rotatably coupled to the body, the front wheels being pivotally coupled to the body so as to steer the wagon;

c) a steering member coupled to the front wheels so as to control the pivoting of the front wheels;

d) center wheels located between the front and rear wheels, the center wheels being raised relative to the front and rear wheels.

14. The push toy wagon of claim 13 wherein the front, center and rear wheels are mounted on respective axles, the axle of the center wheels being raised relative to the axles of the front and rear wheels.

15. The push toy wagon of claim 13 wherein the front and rear wheels each have an outside diameter, the center wheels have an outside diameter that is smaller than the outside diameters of the front and rear wheels.

16. The push toy wagon of claim 13, further comprising a foot cavity located in the rear end portion of the body, the foot cavity facing rearwardly and having a bottom wall therein.

* * * * *